US010215582B1

(12) United States Patent
Goyal et al.

(10) Patent No.: US 10,215,582 B1
(45) Date of Patent: Feb. 26, 2019

(54) NAVIGATION SYSTEM INCLUDING AUTOMATIC SUPPRESSION OF NAVIGATION PROMPTS FOR KNOWN GEOGRAPHIC AREAS

(71) Applicant: General Motors LLC, Detroit, MI (US)

(72) Inventors: Anurag Ashok Goyal, Plymouth, MI (US); Andrew James Motika, Royal Oak, MI (US)

(73) Assignee: General Motors LLC, Detroit, MI (US)

( * ) Notice: Subject to any disclaimer, the term of this patent is extended or adjusted under 35 U.S.C. 154(b) by 0 days.

(21) Appl. No.: 15/689,671

(22) Filed: Aug. 29, 2017

(51) Int. Cl.
| | |
|---|---|
| *G01C 21/36* | (2006.01) |
| *G08G 1/0968* | (2006.01) |
| *G06F 3/16* | (2006.01) |
| *G06F 17/30* | (2006.01) |
| *G06F 3/0488* | (2013.01) |

(52) U.S. Cl.
CPC ..... *G01C 21/3641* (2013.01); *G01C 21/3629* (2013.01); *G06F 3/165* (2013.01); *G06F 17/30345* (2013.01); *G08G 1/096872* (2013.01); *G06F 3/0488* (2013.01)

(58) Field of Classification Search
CPC .... G01C 21/00; G01C 21/36; G01C 21/3641; G01C 21/3629; G01S 19/42

USPC ........................... 700/94; 701/538, 400, 428
See application file for complete search history.

(56) References Cited

U.S. PATENT DOCUMENTS

| | | | | |
|---|---|---|---|---|
| 2013/0311081 | A1* | 11/2013 | Yamakawa | G01C 21/00 701/428 |
| 2015/0100231 | A1* | 4/2015 | Weir | G01C 21/34 701/400 |
| 2017/0122765 | A1* | 5/2017 | Boss | G01C 21/3641 |
| 2017/0234690 | A1* | 8/2017 | Kandangath | G01C 21/3629 701/428 |

\* cited by examiner

*Primary Examiner* — Melur Ramakrishnaiah
(74) *Attorney, Agent, or Firm* — Leydig, Voit & Mayer, Ltd.

(57) ABSTRACT

A navigation system is described that is configured to carry out selectively suppressing audio turn-by-turn instructions on the navigation system. The navigation system maintains a step n-gram table for an identified entity. Each entry in the step n-gram table includes a navigation step n-gram identification, and a count value. The navigation system generates a turn-by-turn direction for the identified entity that includes a step n-gram identification, a description of a navigation direction, and a known status of the step n-gram to the identified entity. The known status is established according to a criterion including at least the count value for the navigation step n-gram. Upon completion of the step n-gram, the navigation system updates the entry in the step n-gram table.

24 Claims, 7 Drawing Sheets

| Step id | Pre-step location (Current road or address) | Post-step location (Result road or address) | Step instruction (turn left, merge) | Latitude | Longitude |
|---|---|---|---|---|---|
| 1 | East Big Beaver Rd | I-75 S Ramp | Turn right | 42.5585773 | -83.1651466 |
| 2 | I-75 S Ramp | I-75 S | Merge | 42.5586718 | -83.1611406 |
| 3 | Coolidge Hwy S | E 14 Mile Road | Turn left | 42.5347199 | -83.1780273 |

FIG. 3B

| Step Id 1 | Step Id 2 | Count | Known | Timestamp last recorded |
|---|---|---|---|---|
| 1 | 2 | 50 | True | 2/17/17 |
| 2 | 10 | 1 | False | 1/2/17 |

FIG. 3C

| Previous Step ID | Current Step ID | Pre-Step location (Current road or address) | Post-Step location (Resulting road or address) | Step Instruction (turn left/right, merge left/right) | Latitude | Longitude | "Known" status |
|---|---|---|---|---|---|---|---|
| 380 | 381 | 382 | 383 | 384 | 385 | 386 | 387 |

FIG. 3D

| Step (1) ID | Step (2) ID | Time/Date Stamp |
|---|---|---|
| 390 | 391 | 392 |

FIG. 3E

NAVIGATION SYSTEM INCLUDING AUTOMATIC SUPPRESSION OF NAVIGATION PROMPTS FOR KNOWN GEOGRAPHIC AREAS

FIELD OF THE INVENTION

This invention relates generally to the field of in-vehicle navigation systems and services. More particularly, the invention is directed to controlling operating modes of in-vehicle navigation systems based upon inferred driver familiarity with a given geographical area through the use of historical driver information maintained by the telematics system with which the vehicle is associated.

BACKGROUND OF THE INVENTION

Telematics units within mobile vehicles provide subscribers with connectivity to a telematics service provider (TSP). The TSP provides the subscriber with an array of services ranging from emergency call handling and stolen vehicle recovery to diagnostics monitoring and turn-by-turn navigation. Telematics units are often provisioned and activated at a point of sale when a subscriber purchases a telematics-equipped vehicle. Upon activation, the telematics unit can be utilized to provide a subscriber with the telematics services.

Audio navigation prompts are an integral part of virtually every navigation device/service. The audio navigation prompts are, of course desirable in a variety of circumstances inasmuch as users can receive directions without having to view a navigation display. With integrated navigation systems, navigation displays are typically positioned within vehicle dashboards. This contrasts with standalone navigation devices that are often attached to an inside surface of a vehicle windshield. Integrating a navigation system into a vehicle's audio-visual infrastructure presents the opportunity of rendering audible turn-by-turn directions via the vehicle's infotainment/sound system speakers. The integration of the navigation system into the primary sound system ensures vehicle occupants are able to clearly understand the audible turn-by-turn directions and lessens the need to visually observe such directions. However, the enhanced presence of audible directions potentially enhances user annoyance when audible directions are needlessly issued in a potentially obtrusive manner.

For example, on a well known route (e.g. a route to work/school) that is taken without variation every weekday—or even one that a driver has taken several times in the past and thus needs no assistance—the audio turn-by-turn directions, potentially issued at a relatively high decibel level, may be viewed as an annoyance. The potential annoyance associated with even a relatively short disruption of a phone call or audio entertainment may lead users to disable the audio output aspect of the navigation system turn-by-turn directions thereby causing the audio output to be underutilized at times when it would be useful to the vehicle occupants.

BRIEF SUMMARY OF THE INVENTION

A system is described for suppressing audio turn-by-turn directions on known routes and within known geographic areas. The system comprises a processing hardware and a non-transitory computer readable medium. The computer-readable medium includes computer-executable instructions for configuring the processing hardware to carry out a method for selectively suppressing audio turn-by-turn instructions on a navigation system. The method comprises maintaining a step n-gram table for an identified entity, wherein an entry in the step n-gram table comprises: a navigation step n-gram identification, and a count value.

The method further comprises generating a turn-by-turn direction for the identified entity including: a step n-gram identification, a description of a navigation direction, and a known status of the step n-gram to the identified entity, wherein the known status is established according to a criterion including at least the count value for the navigation step n-gram. The method further includes presenting the turn-by-turn direction to a user corresponding to the identity, determining a completion of the step n-gram corresponding to the turn-by-turn direction; and updating, in accordance with the completion of the step n-gram, the entry in the step n-gram table, wherein the updating includes at least incrementing the count value.

The above audio turn-by-turn suppression technology is described in the context of a method and a computer-readable medium (in particular a non-transitory computer-readable medium) including computer-executable instructions that, when executed on a processing hardware, facilitated performing the described method on a navigation system hardware.

BRIEF DESCRIPTION OF THE DRAWINGS

While the appended claims set forth the features of the present invention with particularity, the invention and its advantages are best understood from the following detailed description taken in conjunction with the accompanying drawings, of which:

FIG. 3B is an exemplary set of step description elements in the navigation steps database;

FIG. 3C is an exemplary set of Step n-grams (bigrams) in a Step n-grams table for a particular identified user;

FIG. 3D is an exemplary data structure for a single direction element of a direction sequence list provided by a navigation server to a requesting identified user;

FIG. 3E is an exemplary data structure for a single completed two-step sequence recorded upon completion of the second of the two steps identified in a step bigram;

DETAILED DESCRIPTION OF THE DRAWINGS

Figure 1:
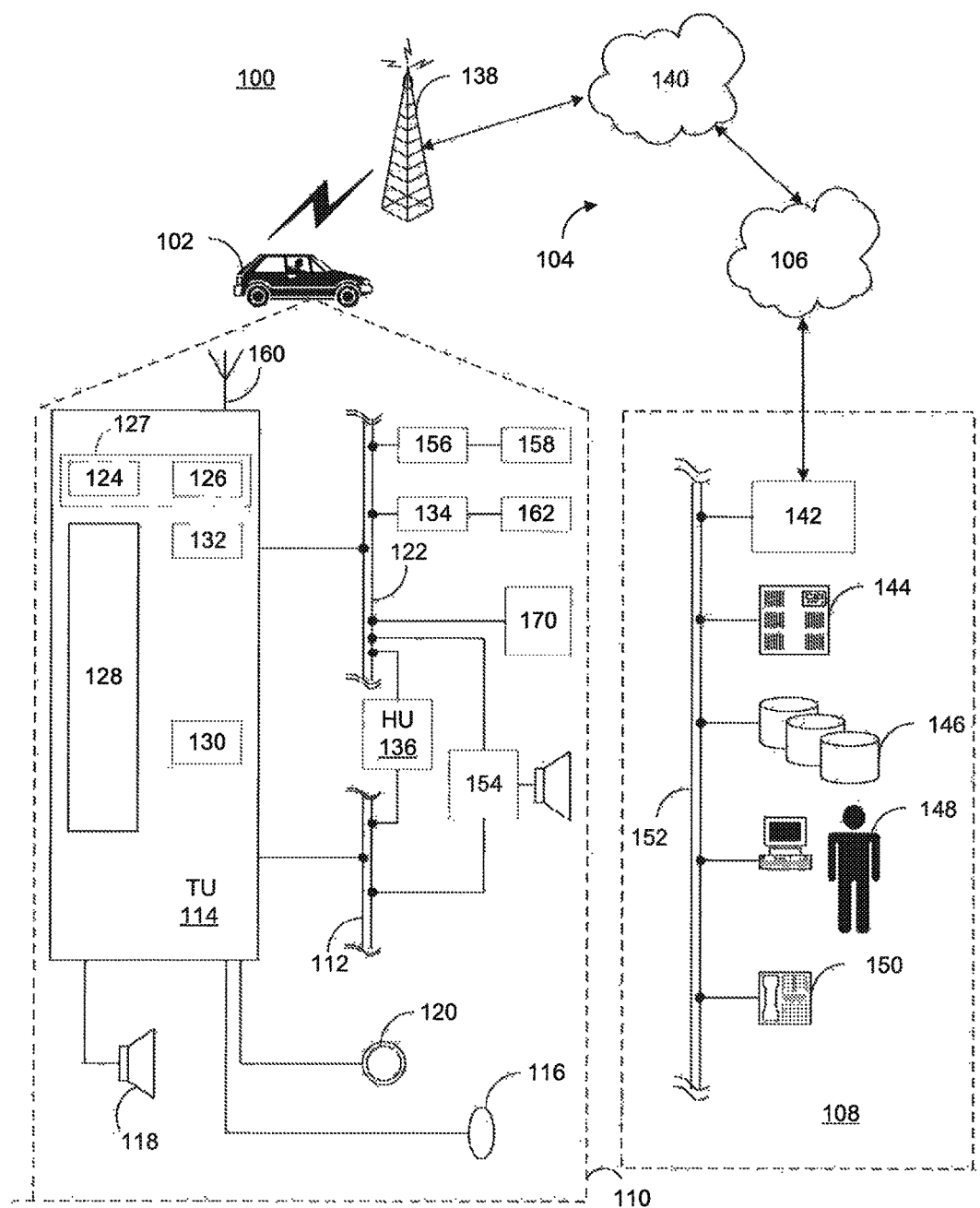
FIG. 1 is a schematic diagram of an operating environment for an in-vehicle telematics-based navigation system in an implementation of the described principles.

Before discussing the details of the invention and the environment wherein the invention may be used, a brief overview is provided. The invention is generally directed to enhancements to existing navigation systems to facilitate selectively disabling/suppressing audio presentation of turn-by-turn directions. More particularly, such audio output is suppressed in cases where the vehicle containing the navigation system, which is capable of rendering audio turn-by-turn directions, is presently traveling a repeatedly traversed route segment transition sequence (at least two segment transitions), without regard to a final intended destination of the vehicle. In such cases the navigation system enters an audio turn-by-turn direction silent mode of operation, while continuing to provide visual navigation prompts/directions, wherein audio turn-by-turn directions are suppressed. The silent mode of operation is maintained, and the system suppresses audio turn-by-turn directions, as long as the vehicle continues to encounter well-known route segment transitions—a circumstance likely encountered when a driver is traveling on a repeatedly followed route to a destination (e.g. traveling on a route to/from work). The navigation visual output on the touchscreen is unaffected by the suppression of the audio turn-by-turn directions described above.

Previously, users manually disabled the audio turn-by-turn directions on navigation systems. Such ad-hoc, manual disabling may lead to under-utilization of an otherwise desirable feature (audible directions) of navigation systems where visual directions are presented on either a windshield mounted device or a touchscreen integrated into a vehicle dashboard.

Moreover, the audio turn-by-turn direction suppression logic monitors the progress of the vehicle on a repeatedly traveled route to detect when the vehicle deviates from the current/familiar route. Upon detecting current travel within a relatively unknown route segment transition sequence for which driver familiarity cannot be imputed, the audio turn-by-turn output is enabled. Moreover, the audio suppression logic is not based on whether the vehicle remains on a calculated route to a previously specified destination. Rather, the sole determining test for whether audio directions are re-enabled is a user's familiarity with a currently traveled route segment transition sequence (e.g. a last and next navigation segment transition as currently calculated by the navigation system on a route to the specified destination).

The above-summarized system, while potentially viewed as simple in concept, is faced with a number of challenges in actual implementation. Such challenges include: determining who is presently driving the vehicle (to access an appropriate driver history used to guide driver familiarity), attributing route segment transitions to particular identified drivers, maintaining a record of previous route segment transitions, determining when a particular recorded (tabled) event instance relating to a particular route segment transition sequence is too old and should be purged from the history of route segment transition sequence events maintained for a particular driver, and deciding when the historical driving of a particular route segment transition sequence indicates sufficient driver familiarity to invoke suppressing the audio turn-by-turn directions, etc.

The following provides illustrative examples of navigation system components incorporating principles of automatically disabling navigation prompts when a vehicle/driver is currently navigating a well-known route segment transition sequence—at which point navigation prompts are likely unnecessary. An identified entity (e.g. a driver X) drives several times (e.g., at least three previous instances) along a same route between a home (H) and an office (O). The navigation system, in accordance with the principles described herein, operates in the audio turn-by-turn direction suppression mode while the driver X travels in the vehicle along the repeatedly traveled route segment transition sequences along a path traversed by the driver X between the home H and the office O. However, while traveling on the well-traveled route between the home H and the office O, the driver X deviates from the often-repeated path between the home H and the office O to go to a new store (S). The driver specifies a new, intermediate destination to the new store S for the navigation system to calculate an updated route including a path to the new store S. The navigation system, upon consulting the driver history for the driver X, determines that the vehicle is currently traveling on an unfamiliar route segment sequence to the new store S. In response to detecting the traveling upon an unfamiliar route segment transition sequence, the navigation system enables the audio turn-by-turn directions. If, however, the vehicle returns to a known route segment transition sequence (e.g. the driver X rejoins the well-traveled route between the home H and the Office O), the navigation system reverts to suppressing the audio turn-by-turn directions. Regardless of the audio direction (suppression) mode of operation, the navigation system continuously provides visual turn-by-turn directions without regard to user familiarity with an upcoming route segment transition.

The above-described example and general principles of the described navigation system including audio turn-by-turn direction suppression capabilities are described in further detail herein below with reference to examples described with reference to the provided figures.

With reference to FIG. 1 there is shown an example of a networked system 100 that may be used with the present method and system and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a high-level overview of one such exemplary networked system 100. However, other systems are suitable for incorporating/employing the described navigation system architecture and associated functionality described herein.

Vehicle 102 is, for example, a mobile vehicle such as a car, truck, recreational vehicle (RV), boat, plane, etc., and the vehicle 102 is equipped with suitable hardware and software that enables it to communicate over a mobile wireless portion of the networked system 100. Vehicle electronic hardware 110 of the vehicle 102 depicted in FIG. 1 includes telematics related electronic hardware such as: a telematics unit (TU) 114, a microphone 116, a speaker 118 and buttons and/or controls 120 connected to the TU 114 to invoke particular services supported by the call center 108. Operatively coupled to the TU 114 is a network connection or vehicle bus 122 (e.g., an ETHERNET bus). Other examples of suitable network technologies for the vehicle bus 122 include a controller area network (CAN), a media oriented system transfer (MOST), a local interconnection network (LIN), and any other appropriate connections such as those that conform with known ISO, SAE, and IEEE standards and specifications, to name a few examples.

The TU 114 is an onboard electronic device including computing hardware and executable instructions on a non-transitory computer-readable medium for providing users with a variety of services through mobile communications with the call center 108. The TU generally includes an electronic processing device 128, a non-transitory electronic memory 130, a cellular chipset/component 124, a wireless modem 126, a dual antenna 160 and a navigation unit 132 (containing a GNSS chipset/component). There are a variety of ways for carrying out the identified electronic components of the TU 114. By way of example, the wireless modem 126 comprises a computer program and/or set of software routines executing within the electronic processing device 128. The cellular chipset/component 124 and the wireless modem 126 may be called the network access device (NAD) 127 of the TU 114. The navigation unit 132 utilizes a touchscreen display (touchscreen) 170 (also utilized by an infotainment center of the vehicle 102) to display messages or graphics to the user. The navigation unit 132 receives user input through the touchscreen 170. The navigation unit 132 may also receive inputs via the vehicle buttons 120. In other implementations, the navigation unit 132 may have its own display and input buttons associated with it (not depicted). In the exemplary embodiments, the audio turn-by-turn direction suppression logic and associated configuration memory is incorporated into: (1) the navigation unit 132 and/or (2) the call center 108 (on a server maintained thereon). In the illustrative example, the directions are provided by the call center 108 in the form of a sequential listing of driving directions on a specified trip. Each driving direction in the sequential listing includes an indicator of whether audio directions are to be suppressed by the navigation unit 132 when the particular driving direction is initially presented on the touchscreen 170.

The TU 114 provides too many services to list them all, but several examples include: presenting turn-by-turn directions (audio/visual form and based upon directions that are locally/remotely generated) and other navigation-related services provided in conjunction with the navigation unit 132, airbag deployment notification, and emergency or roadside assistance-related call center services provided in connection with various crash and or collision sensor interface modules 156 and sensors 158 located throughout the vehicle. Infotainment-related services are also supported via the TU 114 where music, Web pages, movies, television programs, video games and/or other content is downloaded via mobile wireless data network communications to (and stored upon) an infotainment center head unit (head unit) 136 operatively connected to the TU 114 via the vehicle bus 122 and an audio bus 112. In one example, the downloaded content is stored within non-transitory memory media in the head unit 136 for current or later playback by the head unit 136 via the touchscreen 170 and/or an audio component 154.

Vehicle communications preferably use radio transmissions to establish a voice channel with the wireless carrier system 104 so that both voice and data transmissions can be sent and received over the voice channel. Mobile wireless communications (e.g., 3G/4G Long Term Evolution "LTE") between the vehicle 102 and the carrier 180 are enabled via the NAD 127, and any suitable voice/data encoding or modulation technique that provides an acceptable data rate and bit error can be used.

In the illustrative example, the dual mode antenna 160 operates as a radio signal interface for both the navigation unit 132 and the NAD 127.

The microphone 116 provides the driver or other vehicle occupant with a means for inputting verbal or other auditory commands, and can be equipped with an embedded voice processing unit utilizing a human/machine interface (HMI) technology known in the art. Conversely, the speaker 18 provides verbal output to the vehicle occupants and can be either a stand-alone speaker specifically dedicated for use with the TU 114 or can be part of the audio component 154. In either case, the microphone 116 and the speaker 118 enable communication with the occupants through audible speech. The vehicle electronic hardware 110 also includes one or more buttons or controls 120 for enabling a vehicle occupant to activate or engage one or more of the vehicle electronic hardware 110. For example, one of the buttons 120 can be an electronic push button used to initiate voice communication with the call center 108 (whether it be a live advisor 148 or an automated call response system). In another example, one of the buttons 120 can be used to initiate a request/call for emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize the speaker 118 via arbitration on vehicle bus 122 and/or audio bus 112. The touchscreen 170 is connected to the vehicle bus 122 and integrated into a vehicle dashboard (not shown) for displaying information relating to a variety of services supported by the infotainment center head unit 136, the navigation unit 132, and the TTY interface 164. The touchscreen obviates a need for a variety of other, previously separately provided, control buttons. In alternative implementations, the touchscreen 170 is connected directly to the TU 114 or may be included as part of the TU 114.

The vehicle crash and/or collision detection sensor interface 156 is operatively connected to the vehicle bus 122. The crash sensors 158 provide information to the TU 114 via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few.

The wireless carrier system 104 is preferably a cellular telephone system or any other suitable wireless system that transmits signals between the vehicle electronic hardware 110 and the land network 106. According to an example, the wireless carrier system 104 includes one or more cell towers 138, base stations and/or mobile switching centers (MSCs) 140, as well as any other networking components required to connect the wireless carrier system 104 with the land network 106.

The land network 106 can be a conventional land-based telecommunications network that is connected to one or more landline telephones and connects wireless carrier network 104 to the call center 108. For example, the land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

The call center 108 provides the vehicle electronic hardware 110 with a number of different system back-end functions and, according to the example shown here, generally includes one or more switches 142, servers 144 (see FIG. 2 including Navigation Server 144A described further herein below), databases 146 including specialized tables (see FIG. 2 including User profiles table 220, Navigation Steps table 230 and User Step n-grams tables 240) for carrying out particular functionality described herein, live advisors 148, as well as a variety of other telecommunication and computer equipment 150 that is known to those skilled in the art. These various call center components are preferably coupled to one another via a network connection or bus 152, such as the one previously described in connection with the vehicle electronic hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing.

The modem 150 preferably includes an encoder, as previously explained, and can be connected to various devices such as the servers 144 and the databases 146 described in the preceding paragraph. For example, the databases 146 may store a variety of data tables relating to automatically suppressing audio navigation prompts under circumstances where a current driver is operating the vehicle at a part of a route where a next route segment transition is well known to the driver. Such data tables include: a navigation step table identifying navigation steps (each assigned a unique identification), telematics subscriber driver (user) profile records, driving history (combinations of steps traversed—e.g. n-grams) of an identified driver, or any other pertinent subscriber information that may bear upon operation of the navigation unit 132 and the navigation server 144A including audio turn-by-turn direction suppression logic that operates upon known driving history (segment transitions traversed) of identified vehicles and/or drivers based upon the driver/user history information stored within the databases 146.

Although the illustrated example has been described as it would be used in conjunction with a manned call center 108, it will be appreciated that the call center 108 can be any central or remote facility, manned or unmanned, mobile or fixed, to or from which it is desirable to exchange voice and data. Moreover, the audio-suppression logic described herein is executed exclusively by a suitably configured processing component of the navigation server 144A (see FIG. 2).

Figure 2:
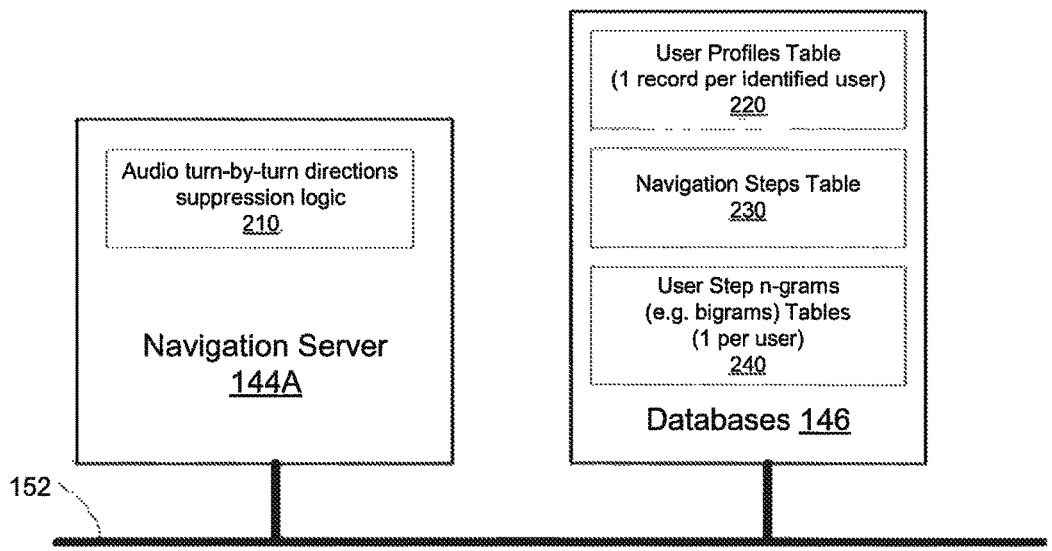
FIG. 2 is a schematic diagram showing additional details regarding the telematics-based navigation server component including audio turn-by-turn direction suppression logic and associated databases in accordance with an implementation of the described principles.

Turning to FIG. 2, a schematic diagram summarizes exemplary components of the navigation server 144A and particular tables of the databases 146 that are of interest with the respect to the principles of suppressing audio turn-by-turn directions and the manner in which the components may be interrelated to execute those principles. It will be appreciated, however, that the illustrated architecture is merely an example, and that the disclosed principles do not require that the call center 108 (including the navigation server 144A and databases 146) and vehicle including the navigation unit 132 be configured as shown. Notably, rather than reside at the call center 108, the user-specific data, navigation step data (common to all drivers) and direction suppression logic may be incorporated into, for example, the navigation unit 132 and associated physical memory storing at least a relevant portion of the database information described above that pertains to particular registered users of the vehicle 102 containing the telematics unit 114.

In the illustrated example, the navigation server 144A, which carries out a variety of route selection and navigation services on behalf of the navigation unit 132 of the vehicle 102, includes tangible non-transient computer-readable media as storage for instructions and applications, as well as instruction and data processing hardware for executing those instructions and applications. In particular, the navigation server 144A is configured with instructions constituting an audio turn-by-turn directions suppression logic 210 (suppression logic 210). The suppression logic 210 assesses the user profiles table 220, the navigation steps table 230 and the User Step n-grams tables 240 that contain information bearing upon the on/off state of audio navigation prompts issued to a currently registered user of the vehicle 102 to which navigation prompts are being issued by the navigation unit 132. The audio turn-by-turn direction suppression logic 210, when active in the navigation server 144A, utilizes the touchscreen 170 as a primary visual I/O interface for operation of the navigation unit 132 of the vehicle 102. The touchscreen 170 is driven by the navigation unit 132 to render visual navigation controls and output.

The tabled, indexed information maintained by the databases 146 (i.e., user profiles table 220, navigation steps table 230 and User Step n-grams tables 240) are discussed herein below with reference to FIGS. 3A, 3B and 3C.

The user profiles table 220 store, on a vehicle and/or identified driver basis (collectively referred to as "users"), profiles describing configuration of the audio turn-by-turn directions suppression logic 210 when various vehicle and/or drivers are identified as a user of the services provided by the navigation server 144A. The information provided by a particular user profile entry (summarized in FIG. 3A) facilitates automatic configuration of the audio turn-by-turn direction suppression logic 210 while the navigation server 144A provides turn-by-turn directions to the navigation unit 132 of the vehicle 102. It will be appreciated that the instructions and applications corresponding to their functions as described below may be implemented on any one of, or on multiple components of, the vehicle electronic hardware 110 and/or networked computer systems. Thus, while a combination of processing hardware and computer instructions on both vehicles and networked servers are described, in alternative embodiments the processing hardware may reside entirely on the vehicles, such as the vehicle 102.

Figure 3A:
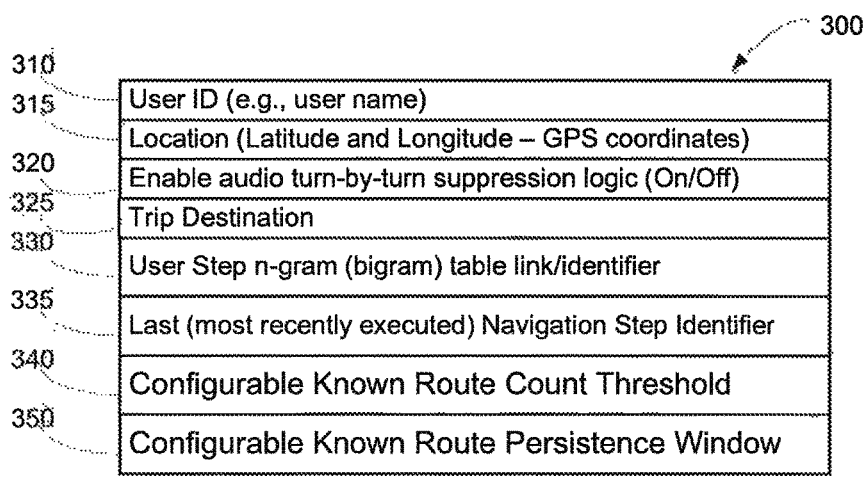
FIG. 3A is an exemplary listing of data elements maintained by the user profiles database to facilitate configuration and operation of the audio turn-by-turn direction suppression logic on a user-specific basis.

Turning to FIG. 3A, an exemplary set of data elements maintained by the navigation server 144A for an identified user in the user profiles table 220 is summarized. The contents of the user profiles table 220 are updated by the navigation server 144A in response to service update messages transmitted by identified users to the navigation server 144A via a mobile wireless network. The messages themselves may be in any form. For example, the messages may each include all the fields identified in FIG. 3A. Alternatively, the update messages contained tagged data fields containing a combination of a data type and data value.

By way of example, a set of data elements 300, for each identified user (potentially a "default user" corresponding to the vehicle 102 in configurations of the navigation unit 132 where individual drivers are not specifically identified), include: a user identification 310 (unique across entire system), a location 315 (e.g., GPS coordinates) corresponding to the most recent location of the vehicle 102 for purposes of rendering navigation directions; an enable audio turn-by-turn suppression mode 320 for the vehicle 102 (that is used to enable/disable the suppression logic 210), a trip destination 325, an identification 330 of a Step Bigram (more generally n-gram) table in the User Step n-grams tables 240—at least one table instance for each uniquely identified user (e.g., a vehicle—e.g. telematics unit 114 identifier) in the user profiles table 220, and a last navigation step identifier 335 (i.e. most recently executed navigation step identifier). Each user profile also includes a configurable count threshold 340 that contains at least one value indicating a point (i.e. number of traversals of a particular step bi-gram—n-gram generally—at which point the particular step bi-gram will be considered to be known and the audio directions will be suppressed during presentation of turn-by-turn directions by the navigation unit 132. An example of a count value is 20 traversals. Additionally, the configurable count threshold 340 may store a set of count values, with each one of the count values having a particular type of associated step bi-gram. For example, a first count value may be associated with local/residential streets, a second count may concern local highways, and a third count may concern interstate highways. Other types of step bi-grams will be contemplated in alternative examples of the exemplary user profiles table 220.

A persistence window 350 field of the user profile specifies a value indicating a period that may pass after a last encounter by a particular user with a step bi-gram before an entry in a user step bi-gram table (for a particular user) of the User Step n-grams tables 240 is purged during a garbage collection operation. Thus, if an identified user has not traversed a particular combination of "n" (e.g. two) navigation steps represented in a particular step n-gram entry in the set of all currently maintained step n-grams entries for the user-specific table of the User Step n-grams tables 240, then the n-gram corresponding to the particular route location is purged from the user step n-grams table for the particular user. For example, an entry is purged if the particular route step has not been traversed in 30 days by a particular user (driver or vehicle depending on the entity corresponding to the entry corresponding to a particular Step n-gram). Thus, a relatively compact, simple combination of elements are used to describe each user/vehicle in the user profiles table 220, in the example provided in FIG. 3A.

Turning to FIG. 3B, an exemplary set of three navigation step entries are provided that may be stored as table entries in the navigation steps table 230. In the illustrative example, the navigation steps table 230 is a single repository of a global set of all known steps maintained for use by all users of the navigation server 144A. A step identification 360 stores a globally unique identifier for a particular navigation step. In the exemplary embodiment, the step identifier value is also an index into the navigation steps table 230, thus enabling expedited retrieval of corresponding information (discussed hereafter) for each identified navigation step represented in the navigation steps table 230.

A pre-step location 362 may be provided in the form of a text entry which identifies a current road or address of a vehicle that is about to execute a step (e.g. transition to a next segment) on a current traveled route. A post-step location 364 may be provided in the form of a text entry which identifies a result road or address of a vehicle after executing a step (e.g. transition to a next segment) on a current traveled route. A step instruction 366 may be provided that describes an action carried out by a vehicle driver to execute the identified step. Examples of directions include: turn right, turn left, merge, continue, etc. A latitude 368 and longitude 369 specify global positioning system (GPS) coordinates where two rights of way, corresponding to the pre-step location 362 and the post-step location 364, meet. Having described exemplary fields of identified steps stored in the navigation steps table 230, a wide variety of alternative ways of storing the above-described step information are contemplated.

A unifying theme of all alternatives is to ensure that navigation steps are uniquely identified for use in counting instances when a given user/vehicle executes one of the identified steps—identified when a particular pre/post step location are traversed in order by executing the direction in accordance with a combination identified in fields 362, 364, 366, 368 and 369 of an identified entry in the navigation steps table 230. Fewer than all the fields identified above may be used to identify a step table element in the navigation steps table 230. For example, a particular navigation step element may be uniquely identified by a combination of a pre-step location and a post-step location. In such case, it is not necessary to consult additional fields such as the longitude and latitude combination of fields 368 and 369 for a navigation step that is uniquely identified based on the pre- and post-step locations.

Contents of the User Step n-grams tables 240 are described with reference to FIG. 3C. In the illustrative example, a separate user step n-gram table is maintained for each uniquely identified system user. An n-grain is a contiguous sequence of n items from a sequence of elements. In the case of a "bigram" the number of contiguous elements is two (2). Turning to FIG. 3C, a set of exemplary fields are summarized for an exemplary set of two (2) bigram entries built from consecutively executed pairs of identified Steps (from the navigation steps table 230) during operation of the vehicle 102 by an identified user. A step Id 1 370 specifies a first traversed identified step (from the navigation steps table 230) of a bigram. A step Id 2 372 specifies a second traversed identified step (from the navigation steps table 230) of the bigram. A count 374 maintains a value corresponding to the total number of counted instances where the two identified navigation steps in fields 370 and 372 of the particular user identification-specific one of the User Step n-grams tables 240 for the identified user have been previously consecutively encountered.

The value within the count 374 may be reset (in the context of table garbage collection by the navigation server 144A) under certain conditions such as if a particular combination of identified steps is not traversed by a user for a specified period of time (e.g., 3 months). The resetting of the count field 374 may be performed when the navigation server 144A generates a direction sequence for a trip requested by an identified user, including setting "known" statuses for particular n-step combinations in the direction sequence. In such case, the navigation server 144A compares a current date to a last date in which the particular n-step direction sequence was known to have been executed by the identified user. If the difference in the dates exceeds a specified period (e.g., 3 months), then the count field 374 is cleared by the navigation server 144A.

With continued reference to FIG. 3C, a known status 376 contains a value (e.g. Boolean) indicating the known/unknown status of the particular bigram entry corresponding to a last and next navigation step combination identified in fields 370 and 372. The "known" status is obtained by applying the current count 374 to the count threshold specified by an identified user (or alternatively a default count threshold in the event that a user profile does not specify a particular count threshold).

A timestamp 378 indicates the last date in which a particular navigation step bigram combination entry was updated for a particular user table within the User Step n-grams tables 240. Garbage collection was briefly mentioned above. It is important to carry out garbage collection upon occurrence of a triggering event (e.g. commencement of a trip, expiration of a delay timer, etc.) to keep the size of user step n-grams tables 240 reasonably compact. The size impacts search speed when the navigation server 144A is executing the audio suppression logic 210. The size also impacts the physical memory needs of the databases 146. Thus, in a particular example, when the telematics unit 114 issues a first message upon starting a first trip of a day, the navigation server applies a value in the persistence window 350 field to the timestamp 378 in each entry in the bigram table, of the n-grams tables 240, corresponding to the identified user to conduct a purging of table entries that have not been updated within a time window specified by the current date and the time span represented by the value stored in the persistence window 350 field.

Referring now to FIG. 3D, an exemplary set of fields are provided for a direction element of a direction sequence provided for a specified trip. Several of the direction element fields are taken from the navigation step fields described herein above with reference to FIG. 3B. However, two additional fields, a previous step ID 380 and a "Known" status 387, are included to facilitate the audio direction suppression functionality described herein. The previous step ID 380 stores a globally unique identifier corresponding to a preceding executed direction by a user on a particular trip route. The previous step ID 380 is used in conjunction with a current step identification 381, which stores a globally unique identifier assigned to a particular current navigation step in a provided direction sequence, to identify and update a particular bigram table entry corresponding to a previous/current step ID pair provided by the previous step ID 380 and the current step identification 381. A pre-step location 382 may be provided in the form of a text entry which identifies a current road or address of a vehicle that is about to execute a step (e.g. transition to a next segment) on a current traveled route. A post-step location 383 may be provided in the form of a text entry which identifies a result road or address of a vehicle after executing a step (e.g. transition to a next segment) on a current traveled route. A step instruction 384 may be provided that describes an action carried out by a vehicle driver to execute the identified step. Examples of directions include: turn right, turn left, merge, continue, etc. A latitude 385 and longitude 386 specify global positioning system (GPS) coordinates where two rights of way, corresponding to the pre-step location 382 and the post-step location 383, meet. The "Known" status 387 stores a Boolean/status value taken from known field 376 of FIG. 3C indexed by applying the values in the previous step ID) 380 and the current step ID 381 to step ID 1 field 370 and step ID 2 field 372, respectively to the user step n-grams table corresponding to the identified user in the user step n-grams tables 240.

Turning to FIG. 3E, an exemplary data structure is provided for a single completed two-step sequence (step bigram) element recorded upon completion of the second of the two steps identified in a step bigram. A step ID 1 field 390 and a step ID 2 field 391 store a combination of step IDs extracted from fields 380 and 381 of a successfully completed trip step defined by the combination of fields depicted in FIG. 3D. A time/date stamp field specifies a time/date on which the step was completed. The completed two-step sequence element is temporarily buffered on the vehicle until a triggering event occurs (e.g., a trip completes). The accumulated completed two-step sequence elements are used to update counter and timestamp fields in a step bigram table for an identified user.

With continued reference to FIGS. 1, 2 and 3A, the navigation server 144A (via the touchscreen 170) supports a set up/configuration interface through which users input the information stored in the user profiles table 220 records further described with reference to the exemplary set of data elements 300 depicted in FIG. 3A. During configuration, the navigation server 144A, through configuration choices entered by a user via the touchscreen 170 (and audio system 154), prompts the user to specify a default audio turn-by-turn suppression mode (on/off) that establishes a default state of the system for all subsequent uses of the navigation server 144A services. Such enabling/disabling of the audio suppression feature affects operation of the audio turn-by-turn directions suppression logic 210. However, by way of example, such disabling of the suppression logic 210 does not prevent the navigation server 144A from acquiring/storing traveled route information maintained in the User Step n-grams tables 240.

During operation the navigation server 144A monitors combinations of previous/next navigation steps during a trip. If a sequence of "n" (e.g. n=2) identified navigation steps-specific counter indicates sufficient familiarity with a navigation step sequence including the next identified navigation step (e.g. the route segment sequence has been traveled at least 10 times by the identified user), then the "known" status of is indicated as YES for the identified user.

Figure 4A:
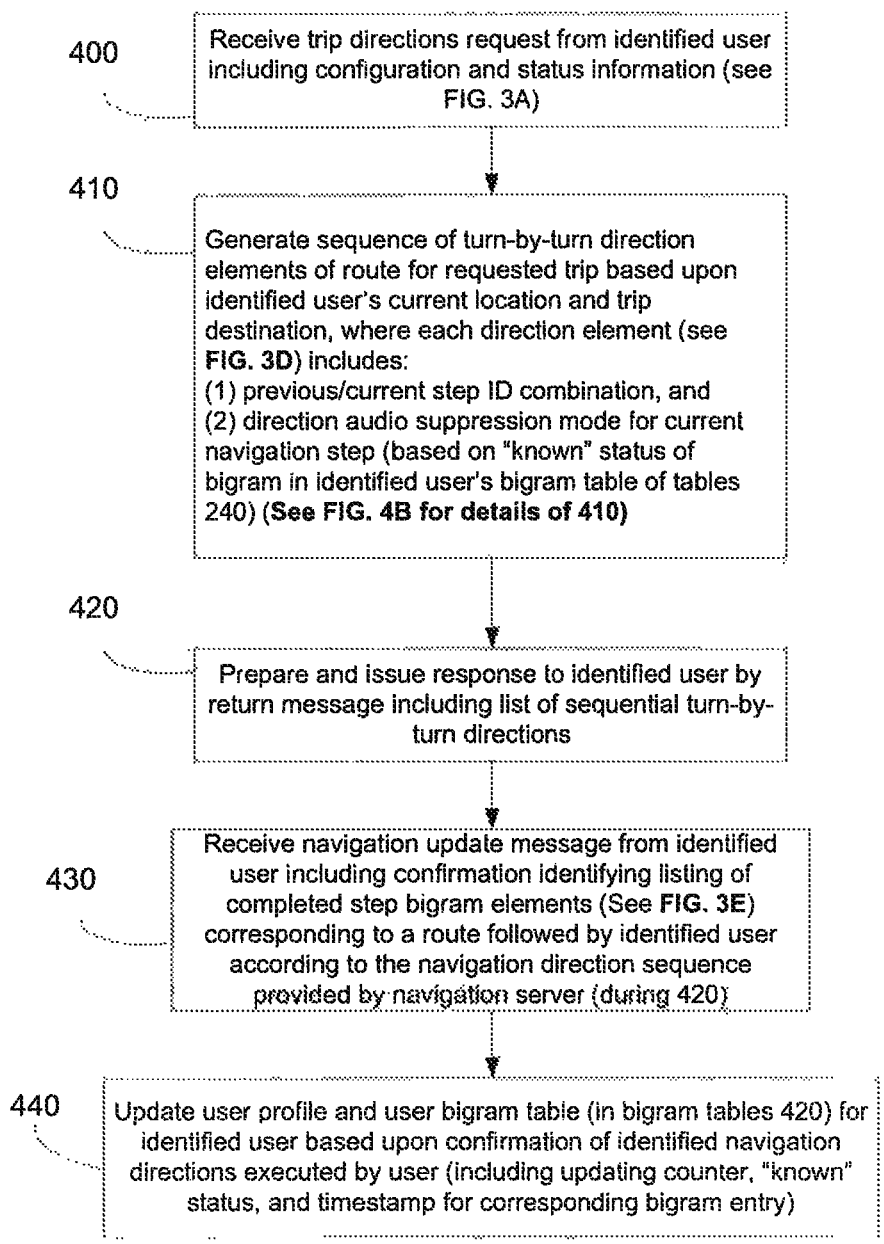
FIGS. 4A and 4B are flowcharts illustrating a process carried out by a navigation server at a call center to respond to a navigation directions request from an identified user and thereafter record completed navigation steps reported by the user upon completion of a trip according to a sequence of directions provided by the navigation server in response to the user request.

Turning to FIG. 4A, a flowchart summarizes a set of stages of operation of the audio turn-by-turn directions suppression logic 210 of the navigation server 144A during operation of the vehicle 102 in accordance with a current set of values stored in a particular user profile, corresponding to a currently identified user, in the User Profiles table 220 maintained in the databases 146 of the call center 108.

During a user navigation request update stage 400, the navigation server 144A receives/processes a trip directions request message identifying a particular user (e.g., vehicle ID, specific identified driver/user). The trip directions request message can include any of the various types of information associated with FIG. 3A. Thus, the trip directions request message may include a new set of configuration values for operation of the suppression logic 210. Additionally the trip directions request message may include a current location (e.g. GPS coordinates) of the vehicle/user. During stage 400, the navigation server 144A updates the contents (see FIG. 3A) of the user-specific entry of the user profiles table 220 according to the contents of the received trip directions request message identifying the particular user.

Thereafter, during a stage 410 the navigation server 144A generates a turn-by-turn direction sequence for a current trip based upon a beginning (e.g. current vehicle 102 location) and ending point specified in the trip directions request received during update stage 400. During stage 410, the navigation server 144A generates a sequence of direction elements corresponding to a proposed trip route, where each direction element in the sequence comprises a data structure comprising the fields depicted in FIG. 3D described herein above. Regarding the audio direction suppression functionality, each direction element includes: (1) the known status 387 value is processed at the vehicle to selectively suppress audio directions when a status is "known", and (2) the two-step ID value combination stored in previous step ID 380 and current step ID 381 is used to update a counter for an appropriate one of the n-grams maintained for the identified user in the user step n-grams tables 240 after the user/vehicle completes the identified step combination. The details of stage 410 are described in detail with reference to FIG. 4B.

During a stage 420 the navigation server 144A prepares and issues a response message to the identified user. The response message includes the sequential turn-by-turn directions generated during 410. In the illustrative example, instructions for an entire route are bundled into a single response to reduce network communication load. However, in alternative examples, the instructions may be broken down into smaller groups. In an extreme case, each navigation direction is sent on an individual basis by the navigation server 144A to an identified user after the user responds to a previous direction message that the direction has been completed.

During a stage 430 the navigation server 144A receives a navigation update message from the identified user that includes a confirmation listing made up of a sequential listing of completed step bigram elements of a type depicted in FIG. 3E. Thus, for each successfully completed direction, in the previously provided sequence of direction elements during stage 420, the confirmation listing provides a corresponding combination of: step 1 ID (previous step), step 2 ID (current step corresponding to the direction), and a timestamp (e.g. date). Since the timestamp is used as a rough value to determine when a two-step combination was last executed by a user, it is sufficient to provide a single timestamp (date) for the entire returned sequence of executed direction elements received by the navigation server 144A during 430—even if the date changed over the course of executing the provided direction sequence for a trip route.

During stage 440 the navigation server 144A performs operations for updating contents of entries (potentially creating a new one if the step 1 ID and step 2 ID sequence pair is not located in the user-specific table) in a user identifier-specific table of the user step n-grams tables 240 based upon the returned sequence of executed direction elements received during stage 430. The relevant entries are accessed by the navigation server 144A, to update corresponding count field 374 values, based upon the combination of step 1 and step 2 ID values provided in the sequential listing of executed step elements that are applied to step ID 1 370 and step ID 2 372 in the user-specific user step n-gram table of the n-gram tables 240. For each updated entry in the user's n-gram table, the navigation server 144A updates (increments) the count field 374. Also, the known status 376 is updated/maintained at a "known" status value if the count value meets/exceeds the threshold for declaring a "known" status for a previous/current step ID combination for the identified user. Also, the timestamp last recorded 378 is updated with the date corresponding to the received/processed executed step element.

Figure 4B:
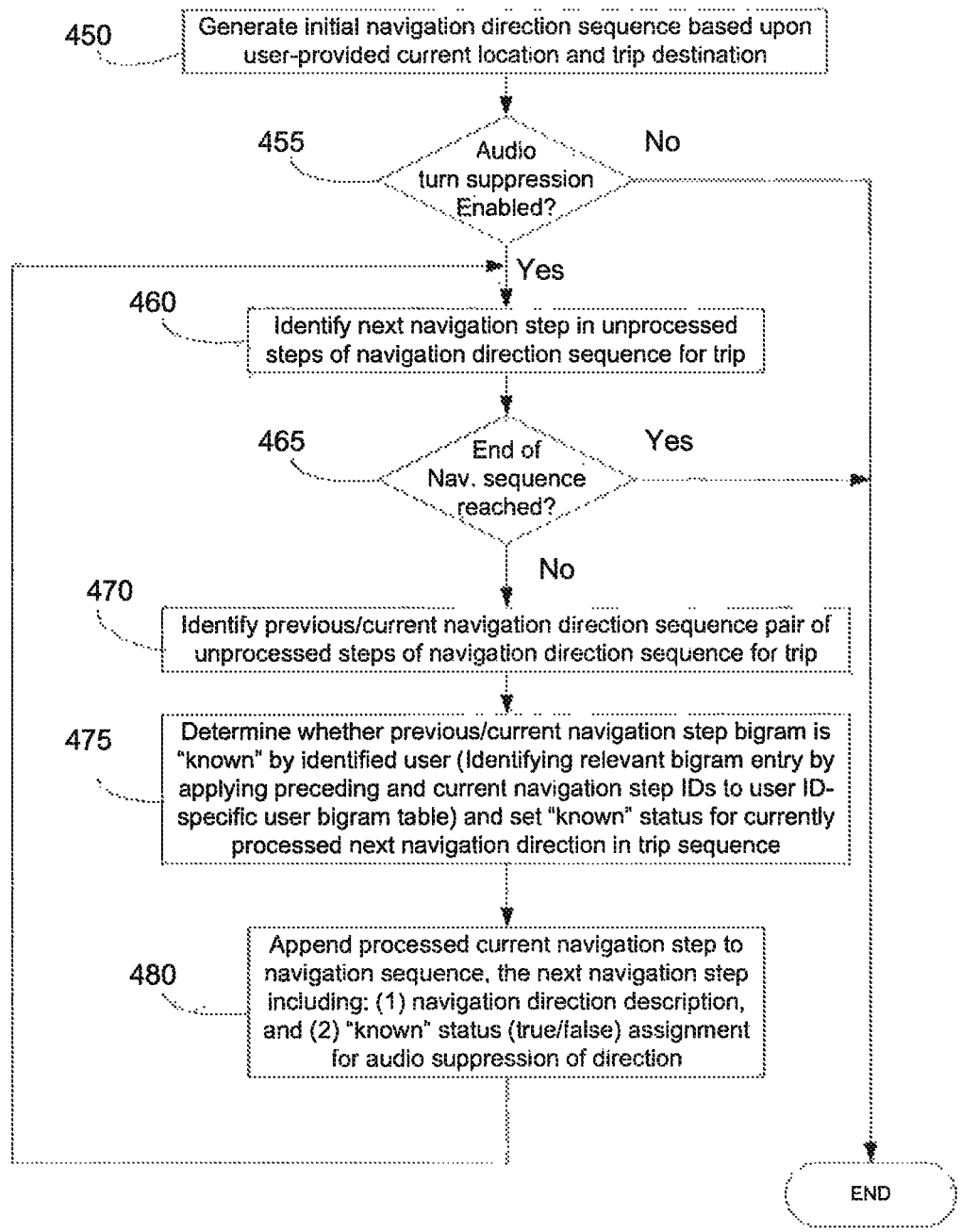

Turning to FIG. 4B, steps are summarized for the navigation server 144A generating a sequence of turn-by-turn direction elements of a route for a requested trip in accordance with stage 410 described above with reference to FIG. 4A. During 450, the navigation server 144A generates an initial navigation direction sequence based upon user-provided information including the trip origination (current location) and destination points. Generating the initial navigation direction sequence for a trip route is well known and will not be described in detail. In the illustrative example, the navigation server inserts a step ID in previous step ID 380 corresponding to the previously processed direction element's step ID. Also, the "known" status 387 is initialized to "false" for each direction element in the trip. The remaining operations in FIG. 4B are directed to modifying the initialized known status 387 based upon a determined "known" status of the particular step 1 ID and step 2 ID combinations specified by fields 380 and 381 of each initialized direction element.

During 455, if audio direction suppression for known identified step combinations is enabled for the identified user, then control passes to step 460. During 460, the navigation server 144A identifies a next navigation step to be processed from the initially created sequence of turn-by-turn direction elements initially created during 450. If the end of the initially created sequence of direction elements has not been reached (i.e., there are more non-processed elements), then control passes to 470. During 470 the navigation server 144A identifies a previous/current navigation direction sequence pair based upon the previously processed direction and the current direction (to be processed). These two values are inserted in the previous step ID 380 and the current step ID 381 fields for the current direction element undergoing processing.

Next, during 475, the navigation server 144A accesses an entry in the identified user-specific step n-gram table, of the user step n-gram tables 240, to determine whether the identified previous/current step combination for the processed direction element has a "known" status for purposes of filling in the known status field 387 for the direction element. Initially, during 475 the navigation server 144A compares the current date to the timestamp last recorded date 378. Based upon the comparison, the navigation server 144A resets the status of the corresponding known 376 field to "false" if the elapsed period exceeds a specified threshold period (e.g. a month)—and otherwise does not change the value of the known 376 field.

During 475, after the initial elapsed time test described above, the navigation server 144A sets the "known" status field 387 for the processed direction element for purposes of the audio direction suppression functionality based upon the currently specified status in the known status 376 field. Thus, if the elapsed time caused the known status field 376 to be reset to "false" then the known status field 387 for the currently processed direction element will also be false. The navigation server 144A does not change the count 374 or timestamp last recorded 378 during 475.

Next, during 480, the navigation server 144A adds the just-processed direction element to the list of previously processed direction elements of the trip direction sequence, where each processed direction element includes specified values for each of the fields enumerated in FIG. 3D. Control returns to 460.

On the other hand, if audio suppression is not currently enabled, then control passes from 455 to the END. In such case, the "known" status 387 (synonymous with "audio suppression") is set to "false" for all direction elements for the specified trip route.

During 465, if no other direction elements remain to be processed from the initialized list of direction elements, then control passes from 465 to the END.

Figure 5:
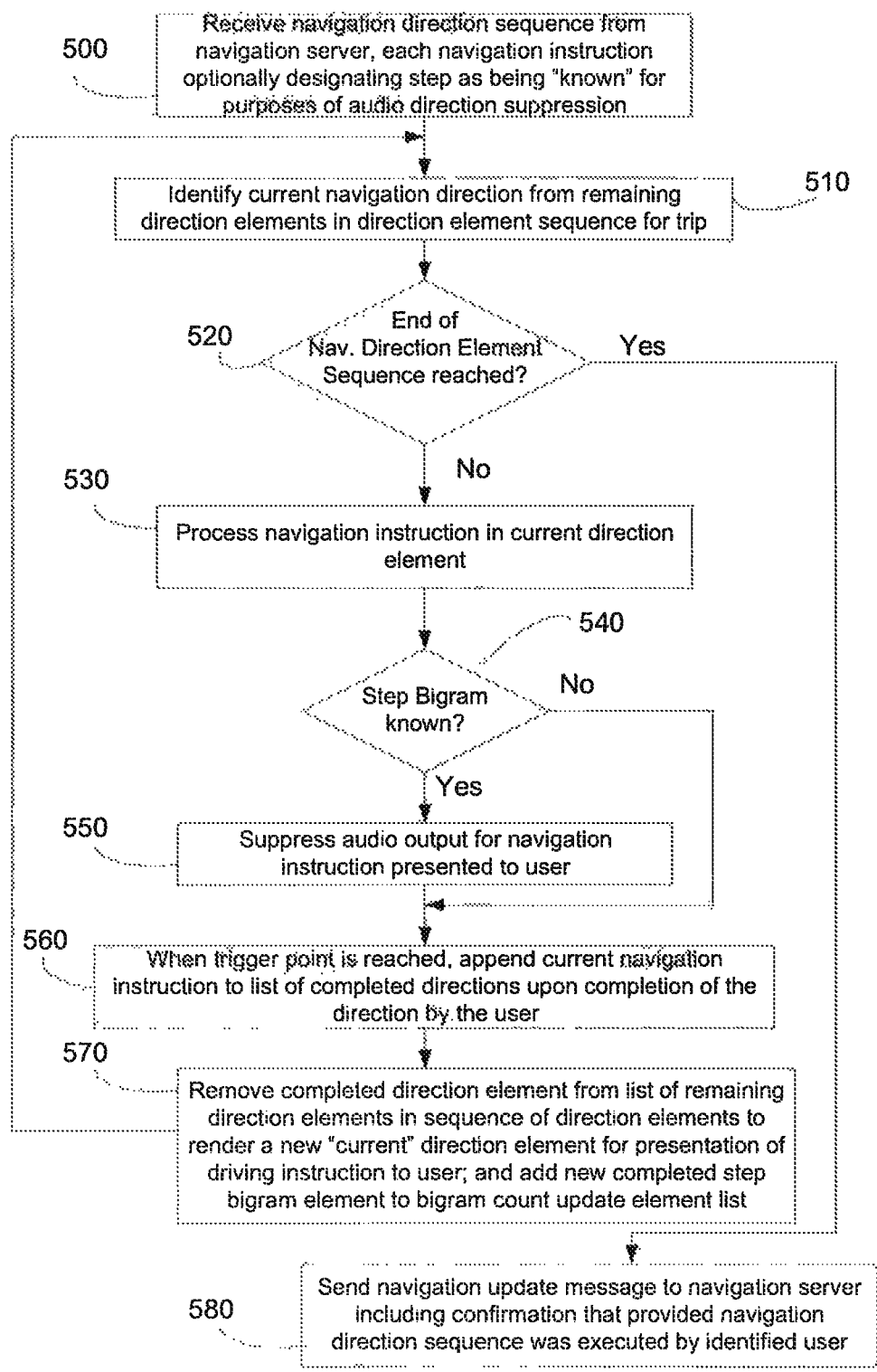
FIG. 5 is a flowchart illustrating a process carried out by a navigation unit on a user vehicle equipped with a telematics unit for processing the sequence of directions provided by the navigation server in accordance with an indicated trip destination according to an illustrative example of the invention.

Turning to FIG. 5, a summary is provided of a process carried out by a navigation unit on the vehicle 102 equipped with a telematics unit 114 for processing the sequence of direction elements provided by the navigation server in accordance with an indicated trip. During 500, the navigation unit receives the processed set of direction elements rendered by the navigation server 144A in accordance with the process summarized in FIG. 4B. Thus, each direction element, in the received sequence of direction elements for a requested trip route, includes: (1) a step bigram comprising a previous step ID and a current step ID; and (2) a known status for the identified step bigram.

During 510, the navigation unit on the vehicle 102 accesses a current navigation direction by accessing the next direction element in the sequence of remaining direction elements for a specified trip route. If, during 520, additional direction elements remain to be processed on the specified trip route, then control passes to 530.

During 530, the navigation unit processes the navigation instruction in accordance with fields 382, 383, 384, 385, 386 and 387 of the instruction element. Additionally, with regard to an audio instruction functionality of the navigation unit, during 540 the navigation unit determines, based on the known status 387 (true/false), whether the step bigram for the current direction element is known. If the known status is "true", then control passes to 550 wherein the navigation unit is configured to suppress audio output when the navigation instruction specified in the step instruction 384 is presented to the vehicle 102 user. Control then passes to 560 wherein the instruction is presented to the user in accordance with the current configuration (suppressed) of the audio output. Otherwise, if the known status is "false", then control passes from 540 to 560 wherein the driving instruction is presented without suppressing the audio output.

Regarding operation of the navigation unit during 560, each direction element (see FIG. 3D) has five pieces of information, latitude, longitude, starting road, ending road, and step direction. Therefore, a vehicle must be on the starting road of the current step before they reach the step. The navigation unit will know this by periodic GPS pings to obtain a current location. When the vehicle arrives at the step latitude and longitude, the navigation unit will assert that the vehicle has crossed that latitude and longitude. To assert completion, the navigation unit acquires a couple of subsequent GPS pings that place the vehicle on the ending road of the specified current step. At this point, the navigation unit registers successful completion of the currently processed direction element.

Next, at step 570, the navigation unit on the vehicle 102 removes the completed direction element from the sequence of remaining direction elements for the current trip. Also, during 570, the navigation unit creates a new completed step bigram element (see FIG. 3E) and adds the new completed step bigram element to a set of completed step bigram elements to be provided to the navigation server 144A to update count values for corresponding entries in the user-specific table in the user step n-grams tables 240. Control then returns to 510.

If, during 520, the final direction element has been processed so that no direction elements remain for the trip, then control passes to 580. During 580 the navigation unit sends a navigation update message, including a listing of completed step bigram elements, to the navigation server 144A. The listing of completed step bigram elements is thereafter processed by the navigation server 144A in accordance with previously described Thus, in summary of the above, once a particular navigation step bigram acquires a "known" status for a particular user, subsequent drives through the first of the two navigation steps and calculation of a next step that is identified as the second of the two navigation steps of the known navigation step bigram will result in operation of the navigation unit 132 output audio feature in a suppressed audio directions mode.

In addition to the above audio navigation direction suppression based on bigram table contents, a geographic area around a known destination (a "known zone") may also be considered to be a same location for purposes of defining known navigation steps and invoking the audio suppression feature merely/solely based upon when a driver approaches a specified range/vicinity of a well known destination (e.g. home, office parking lot, etc.) from any one of multiple surrounding streets.

Moreover, to address a challenge of a new driver or multi driver vehicle situation, when navigation functionality is enabled, the driver may be presented a control button on a user interface to facilitate user control over disabling audio turn-by-turn suppression. The user interface (enable/disable) control button provides users with an option to disable the audio-suppression feature described above. Thus, a new/temporary driver in the vehicle 102 would not be imputed with the traveled segment transition sequence history of a primary/previous driver of the vehicle 102. The multi-driver (of a single car) and multi-car (driving by a single driver) challenges are addressed by the data storage architecture of FIGS. 2 and 3A that support storing identifiable drivers and associated traveled route segment transition sequences (step bigrams) that facilitate: (1) distinguishing between multiple users, and (2) portability of the User Profiles table 220 for particular users having profile information and driving histories stored in the databases 146.

It will be appreciated, however, that the foregoing methods and implementations are merely examples of the inventive principles, and that these illustrate only preferred techniques.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for selectively suppressing audio turn-by-turn instructions on a navigation system, the method comprising:
maintaining a step n-gram table for an identified entity, wherein an entry in the step n-gram table comprises:
a navigation step n-gram identification, and
a count value;
generating a turn-by-turn direction for the identified entity including:
a step n-gram identification,
a description of a navigation direction, and
a known status of the step n-gram to the identified entity, wherein the known status is established according to a criterion including at least the count value for the navigation step n-gram;
presenting the turn-by-turn direction to a user corresponding to the identity;
determining a completion of the step n-gram corresponding to the turn-by-turn direction; and
updating, in accordance with the completion of the step n-gram, the entry in the step n-gram table, wherein the updating includes at least incrementing the count value,
wherein during the presenting, an audio part of the turn-by-turn instruction is selectively suppressed based upon the known status of the turn-by-turn instruction, when the navigation system operates in an audio turn-by-turn suppression mode.

2. The method of claim 1 wherein the step n-gram is a step bigram comprising a sequence of two identified steps.

3. The method of claim 1 wherein each entry in the step n-gram table further includes a time stamp indicating a last time the count value was incremented after completion of the step n-gram by the identified entity, and
wherein the known status of the step n-gram is further established by the criterion including the time stamp.

4. The method of claim 3, wherein the updating includes updating the time stamp.

5. The method of claim 1 wherein each entry in the step n-gram table further includes a known status indicator.

6. The method of claim 1 wherein the step n-gram table is maintained by a navigation server communicatively coupled to a vehicle navigation unit via a mobile wireless communications.

7. The method of claim 1 further comprising resetting the known status of the entry of the step n-gram in the table to a false state solely based upon a passage of time since the count value was incremented.

8. The method of claim 1 further comprising, providing an enable control button on a user interface to facilitate user control over disabling audio turn-by-turn suppression.

9. A non-transitory computer readable medium including computer-executable instructions for carrying out a method for selectively suppressing audio turn-by-turn instructions on a navigation system, wherein the method comprises:
maintaining a step n-gram table for an identified entity, wherein an entry in the step n-gram table comprises:
a navigation step n-gram identification, and
a count value;
generating a turn-by-turn direction for the identified entity including:
a step n-gram identification,
a description of a navigation direction, and
a known status of the step n-gram to the identified entity, wherein the known status is established according to a criterion including at least the count value for the navigation step n-gram;
presenting the turn-by-turn direction to a user corresponding to the identity;
determining a completion of the step n-gram corresponding to the turn-by-turn direction; and
updating, in accordance with the completion of the step n-gram, the entry in the step n-gram table, wherein the updating includes at least incrementing the count value,
wherein during the presenting, an audio part of the turn-by-turn instruction is selectively suppressed based upon the known status of the turn-by-turn instruction, when the navigation system operates in an audio turn-by-turn suppression mode.

10. The non-transitory computer readable medium of claim 9 wherein the step n-gram is a step bigram comprising a sequence of two identified steps.

11. The non-transitory computer readable medium of claim 9 wherein each entry in the step n-gram table further includes a time stamp indicating a last time the count value was incremented after completion of the step n-gram by the identified entity, and
wherein the known status of the step n-gram is further established by the criterion including the time stamp.

12. The non-transitory computer readable medium of claim 11, wherein the updating includes updating the time stamp.

13. The non-transitory computer readable medium of claim 9 wherein each entry in the step n-gram table further includes a known status indicator.

14. The non-transitory computer readable medium of claim 9 wherein the step n-gram table is maintained by a navigation server communicatively coupled to a vehicle navigation unit via a mobile wireless communications.

15. The non-transitory computer readable medium of claim 9 wherein the method further comprises resetting the known status of the entry of the step n-gram in the table to a false state solely based upon a passage of time since the count value was incremented.

16. The non-transitory computer readable medium of claim 9 wherein the method further comprises, providing an enable control button on a user interface to facilitate user control over disabling audio turn-by-turn suppression.

17. A computer system comprising:
a processing hardware; and
a non-transitory computer readable medium including computer-executable instructions for configuring the processing hardware to carry out a method for selectively suppressing audio turn-by-turn instructions on a navigation system, wherein the method comprises:
maintaining a step n-gram table for an identified entity, wherein an entry in the step n-gram table comprises:
a navigation step n-gram identification, and
a count value;
generating a turn-by-turn direction for the identified entity including:
a step n-gram identification,
a description of a navigation direction, and a known status of the step n-gram to the identified entity, wherein the known status is established according to a criterion including at least the count value for the navigation step n-gram;

presenting the turn-by-turn direction to a user corresponding to the identity;

determining a completion of the step n-gram corresponding to the turn-by-turn direction; and updating, in accordance with the completion of the step n-gram, the entry in the step n-gram table, wherein the updating includes at least incrementing the count value, wherein during the presenting, an audio part of the turn-by-turn instruction is selectively suppressed based upon the known status of the turn-by-turn instruction, when the navigation system operates in an audio turn-by-turn suppression mode.

18. The computer system of claim 17 wherein the step n-gram is a step bigram comprising a sequence of two identified steps.

19. The computer system of claim 17 wherein each entry in the step n-gram table further includes a time stamp indicating a last time the count value was incremented after completion of the step n-gram by the identified entity, and wherein the known status of the step n-gram is further established by the criterion including the time stamp.

20. The computer system of claim 19, wherein the updating includes updating the time stamp.

21. The computer system of claim 17 wherein each entry in the step n-gram table further includes a known status indicator.

22. The computer system of claim 17 wherein the step n-gram table is maintained by a navigation server communicatively coupled to a vehicle navigation unit via a mobile wireless communications.

23. The computer system of claim 17 further comprising resetting the known status of the entry of the step n-gram in the table to a false state solely based upon a passage of time since the count value was incremented.

24. The computer system of claim 17 further comprising, providing an enable control button on a user interface to facilitate user control over disabling audio turn-by-turn suppression.

* * * * *